US011935546B2

(12) United States Patent
Onat

(10) Patent No.: US 11,935,546 B2
(45) Date of Patent: Mar. 19, 2024

(54) TRANSMISSION ERROR ROBUST ADPCM COMPRESSOR WITH ENHANCED RESPONSE

(71) Applicant: SEMICONDUCTOR COMPONENTS INDUSTRIES, LLC, Phoenix, AZ (US)

(72) Inventor: Erkan Onat, Waterdown (CA)

(73) Assignee: SEMICONDUCTOR COMPONENTS INDUSTRIES, LLC, Scottsdale, AZ (US)

( * ) Notice: Subject to any disclaimer, the term of this patent is extended or adjusted under 35 U.S.C. 154(b) by 33 days.

(21) Appl. No.: 17/739,954

(22) Filed: May 9, 2022

(65) Prior Publication Data

US 2023/0058583 A1 Feb. 23, 2023

Related U.S. Application Data

(60) Provisional application No. 63/260,431, filed on Aug. 19, 2021.

(51) Int. Cl.

*G10L 19/005* (2013.01)
*G10L 19/032* (2013.01)
*G10L 19/16* (2013.01)

(52) U.S. Cl.

CPC .......... *G10L 19/005* (2013.01); *G10L 19/032* (2013.01); *G10L 19/167* (2013.01)

(58) Field of Classification Search

None

See application file for complete search history.

(56) References Cited

U.S. PATENT DOCUMENTS 7,430,255 B2 9/2008 Shibuya et al.
8,601,338 B2 12/2013 Kolze (Continued)

OTHER PUBLICATIONS

David L. Cohn et al., "The Relationship Between an Adaptive Quantizer and a Variance Estimator," IEEE Transactions on Information Theory, Nov. 1975, pp. 669-671.

(Continued)

*Primary Examiner* — Douglas Godbold
(74) *Attorney, Agent, or Firm* — Ramey LLP

(57) ABSTRACT

Audio streaming devices, systems, and methods may employ adaptive differential pulse code modulation (ADPCM) techniques providing for optimum performance even while ensuring robustness against transmission errors. One illustrative device includes: a difference element that produces a sequence of prediction error values by subtracting predicted values from audio samples; a scaling element that produces scaled error values by dividing each prediction error by a corresponding envelope estimate; a quantizer that operates on the scaled error values to produce quantized error values; a multiplier that uses the corresponding envelope estimates to produce reconstructed error values; a predictor that produces the next audio sample values based on the reconstructed error values; and an envelope estimator. The envelope estimator includes: an updater that applies a dynamic gain to the reconstructed error values to produce update values; and an integrator that combines each of the update values with the corresponding envelope estimate to produce a subsequent envelope estimate.

15 Claims, 3 Drawing Sheets

(56) References Cited

U.S. PATENT DOCUMENTS

| | | | | |
|---|---|---|---|---|
| 8,649,523 | B2 | 2/2014 | Chau | |
| 9,754,601 | B2 * | 9/2017 | Hirschfeld | G10L 19/06 |
| 11,545,164 | B2 * | 1/2023 | Petersen | H03M 7/3046 |
| 2009/0254783 | A1 * | 10/2009 | Hirschfeld | G10L 19/06 375/240 |
| 2012/0243710 | A1 | 9/2012 | Chau | |
| 2013/0204630 | A1 * | 8/2013 | Ragot | G10L 19/032 704/500 |
| 2016/0064007 | A1 * | 3/2016 | Villemoes | G10L 19/032 704/203 |
| 2017/0330572 | A1 * | 11/2017 | Johnston | G10L 19/04 |

OTHER PUBLICATIONS

Gediminas Simkus, et al., "Error Robust Delay-Free Lossy Audio Coding Based on ADPCM," Proc. of the 16th Int. Conference on Digital Audio Effects (DAFx-13), Maynooth, Ireland, Sep. 2-5, 2013, 8 pages.

Gediminas Simkus, et al., "Error Resilience Enhancement for a Robust ADPCM Audio Coding Scheme," 2014 IEEE International Conference on Acoustic, Speech and Signal Processing (ICASSP), IEEE 978-1-4799-2893—Apr. 14, 2014, pp. 3685-3689.

* cited by examiner

Fig. 1
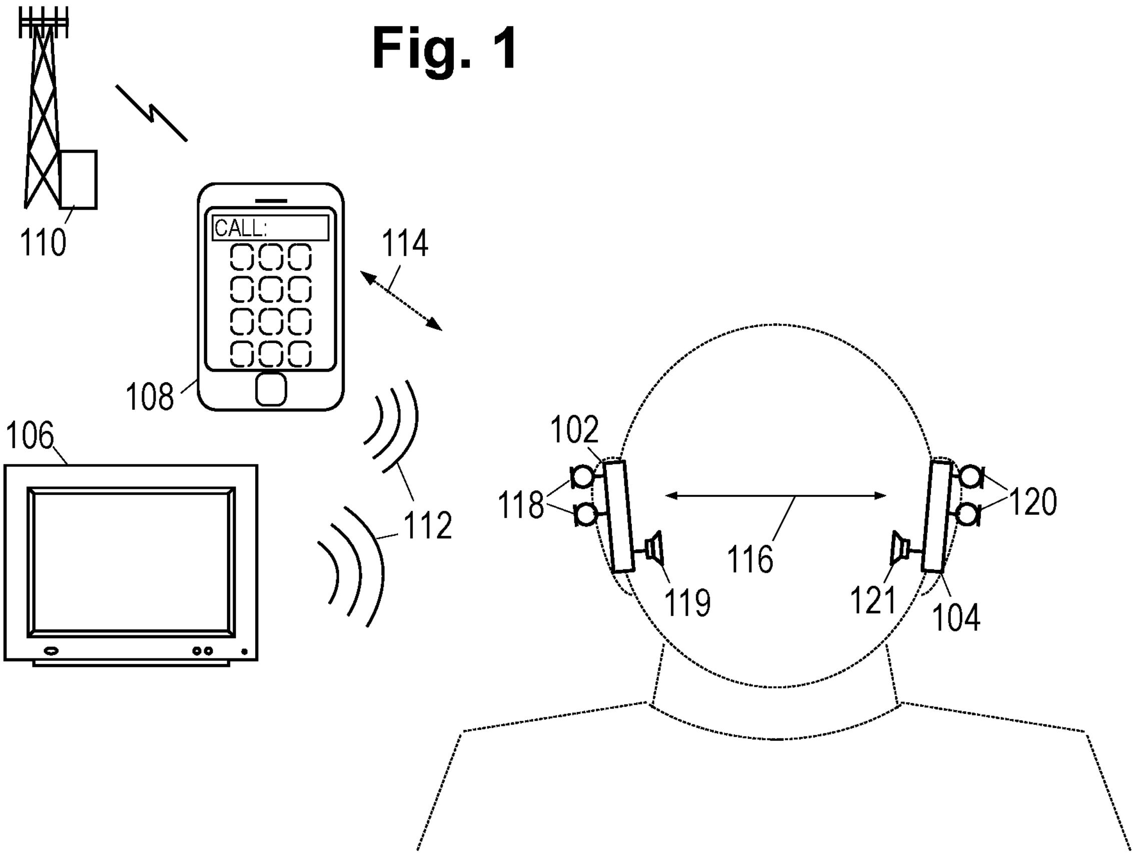
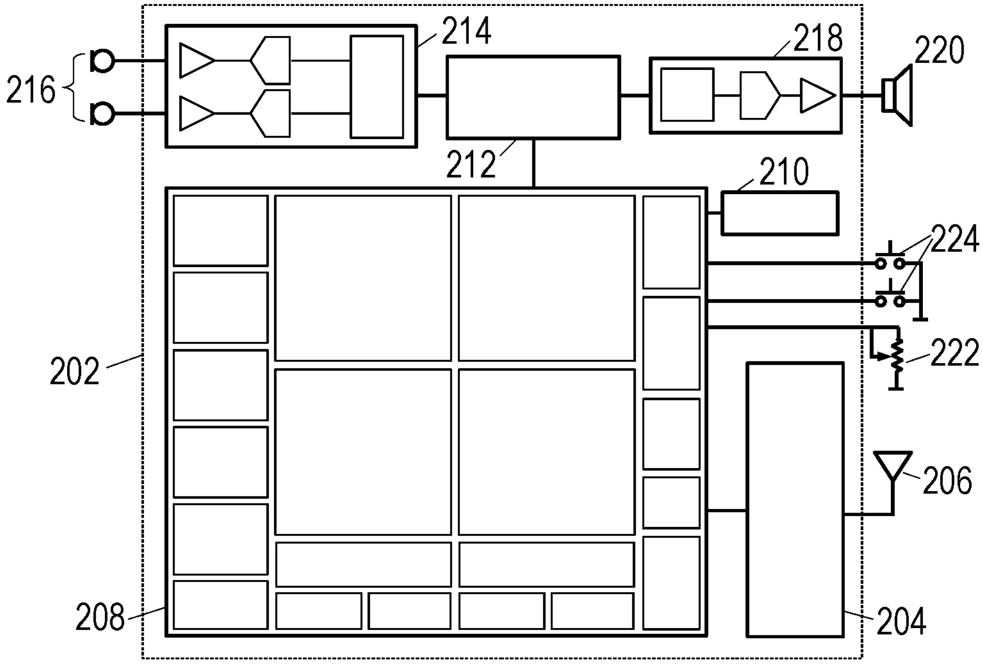
Fig. 2

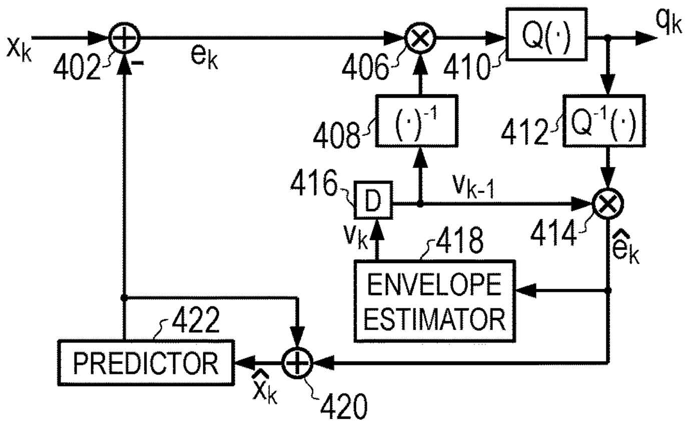
Fig. 4A
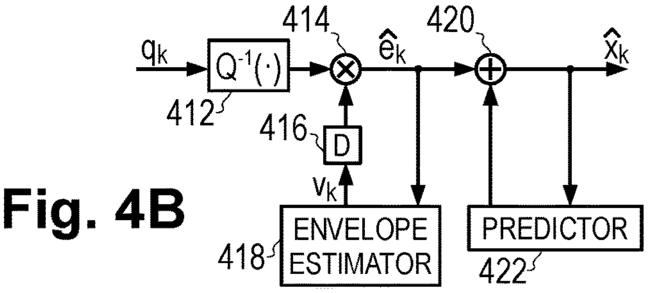
Fig. 4B
Fig. 5
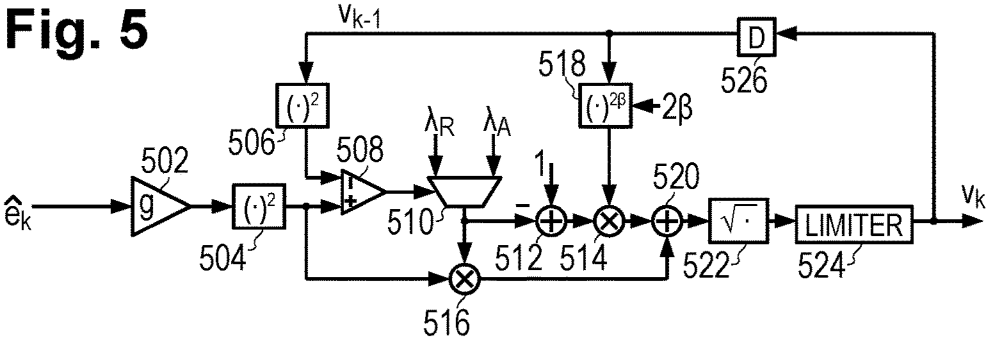
Fig. 6
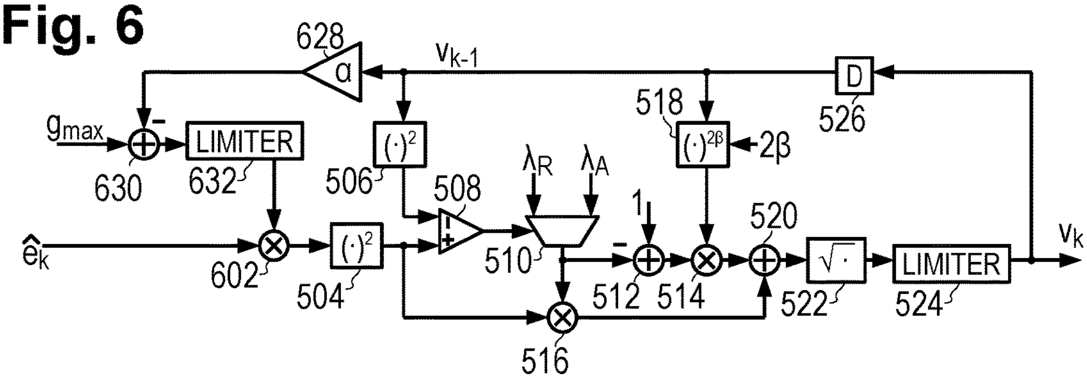

TRANSMISSION ERROR ROBUST ADPCM COMPRESSOR WITH ENHANCED RESPONSE

CROSS-REFERENCE TO RELATED APPLICATIONS

The present application claims priority to Provisional U.S. Application 63/260,431, filed 2021 Aug. 19 and titled "Transmission Error Robust Adaptive Quantization Step Adjustment with Rapid and Optimum Response" by inventor Erlam Onat, which is hereby incorporated herein by reference.

BACKGROUND

There are many situations where it is necessary or desirable for audio communication to occur with low latency in limited bandwidth environments where interference can cause data transmission errors. As one example, modern hearing aids and other hearable devices support low latency audio communication with various electronic devices. Bandwidth and latency requirements can generally be reduced using audio compression techniques that remove unnecessary redundance from the signal. One popular compression technique is adaptive differential pulse code modulation (ADPCM), some modifications of which enhance robustness to transmission errors though doing so at a significant performance cost whether measured in terms of reproduction quality or compression rate. In "Error Resilience Enhancement for a Robust ADPCM Audio Coding Scheme" (2014 IEEE ICASSP p. 3685-89), which is hereby incorporated herein by reference, Simkus et al. propose one approach that achieves improved performance but which unfortunately requires the use of a sideband channel. In many contexts, it would be infeasible or unnecessarily complex to provide for communication of such sideband channel information.

SUMMARY

Accordingly, there are disclosed herein devices, systems, and methods employing adaptive differential pulse code modulation (ADPCM) techniques providing for optimum performance even while ensuring robustness against transmission errors. One illustrative audio communication device includes: a difference element that produces a sequence of prediction error values by subtracting a sequence of predicted audio sample values from a sequence of audio samples; a scaling element that produces a sequence of scaled error values by dividing each prediction error value by a corresponding envelope estimate; a quantizer that operates on the sequence of scaled error values to produce a sequence of quantized error values; a multiplier that uses the corresponding envelope estimates to produce a sequence of reconstructed error values; a predictor that produces the sequence of predicted audio sample values based on reconstructed audio samples derived from the sequence of reconstructed error values; and an envelope estimator. The envelope estimator includes: an updater that applies a dynamic gain to the reconstructed error values to produce a sequence of update values; and an integrator that combines each of the update values with the corresponding envelope estimate to produce a subsequent envelope estimate.

An illustrative audio communication receiver receives an audio data stream conveying a sequence of quantized error values, and includes: a multiplier that uses corresponding envelope estimates to produce a sequence of reconstructed error values based on the sequence of quantized error values; a summation element that combines the sequence of reconstructed error values with a sequence of predicted audio sample values to produce a sequence of reconstructed audio samples; a predictor that produces the sequence of predicted audio sample values based on the sequence of reconstructed audio samples; and an envelope estimator. The envelope estimator includes: an updater that applies a dynamic gain to the reconstructed error values to produce a sequence of update values; and an integrator that combines each of the update values with the corresponding envelope estimate to produce a subsequent envelope estimate.

An illustrative audio communication method includes: obtaining a sequence of quantized error values from an audio data stream; using corresponding envelope estimates to produce a sequence of reconstructed error values based on the sequence of quantized error values; combining the sequence of reconstructed error values with a sequence of predicted audio sample values to produce a sequence of reconstructed audio samples; producing the sequence of predicted audio sample values based on the sequence of reconstructed audio samples; and deriving the corresponding envelope estimates. The estimates are derived by: applying a dynamic gain to the reconstructed error values to produce a sequence of update values; and combining each of the update values with the corresponding envelope estimate to produce a subsequent envelope estimate.

Each of these illustrative embodiments may be employed separately or conjointly, and may optionally include one or more of the following features in any suitable combination: 1. the quantizer is nonlinear. 2. a dequantizer that operates on the sequence of quantized error values to provide the multiplier with reconstructed scaled error values. 3. an encoder that converts the sequence of quantized error values into an audio data stream for storage or transmission. 4. a decoder that, based on the audio data stream, supplies the dequantizer with the sequence of quantized error values. 5. the dynamic gain at the input of the envelope estimator varies based on the previous envelope estimate. 6. the dynamic gain decreases from a maximum gain value to a minimum gain value as the corresponding envelope estimate increases. 7. the envelope estimator includes: a second difference element that determines a difference between the maximum gain value and a scaled version of the corresponding envelope estimate; and a range limiter that produces the dynamic gain by limiting the difference to a range between the minimum and maximum gain values. 8. the envelope estimator includes a comparator to select a larger weight factor for the update values having a larger magnitude than the corresponding envelope estimate and a smaller weight factor for the update values having a smaller magnitude than the corresponding envelope estimate.

BRIEF DESCRIPTION OF THE DRAWINGS

FIG. 1 is an environmental view of an illustrative wireless audio communication system.

FIG. 2 is an integrated circuit layout diagram of an illustrative wireless audio device.

FIG. 4A is a schematic of an illustrative adaptive differential pulse code modulation (ADPCM) compressor.

FIG. 4B is a schematic of an illustrative ADPCM decompressor.

FIG. 5 is a schematic of a first illustrative envelope estimator.

FIG. 6 is a schematic of a second illustrative envelope estimator using a dynamic gain to enable an enhanced response.

DETAILED DESCRIPTION

Figure 3:
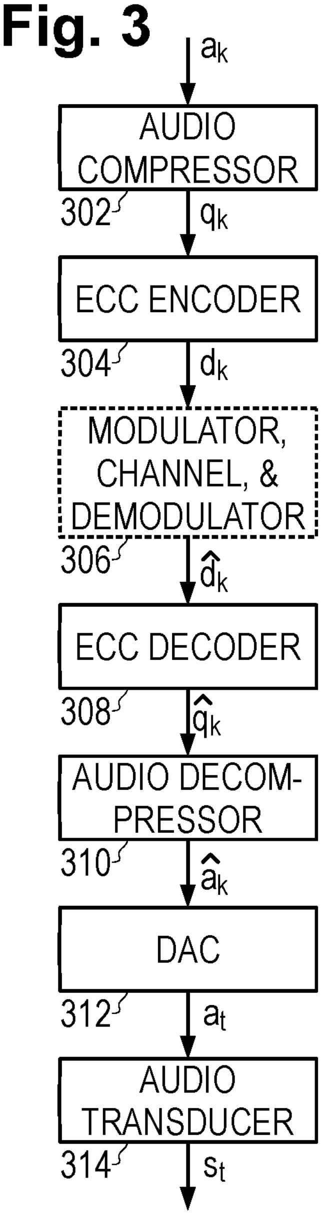
FIG. 3 is a data flow diagram for an illustrative audio communication system.

It should be understood that the following description and accompanying drawings are provided for explanatory purposes, not to limit the disclosure. In other words, they provide the foundation for one of ordinary skill in the art to recognize and understand all modifications, equivalents, and alternatives falling within the scope of the claims.

The present disclosure is best understood in light of a suitable application. As context, FIG. 1 shows an illustrative wireless audio communication system. The illustrative system includes two wireless audio devices 102, 104, schematically illustrated here as hearing aids that support audio streaming, CROS, and/or BiCROS features, but other suitable wireless audio devices include headsets, body-mounted cameras, mobile displays, or other wireless devices that can receive or send a data stream from or to a media device using a wireless streaming protocol. Received data streams may be rendered as analog sound, vibrations, or the like. Also shown are two media devices 106, 108, and a network access point 110.

Illustrated media device 106 is a television generating sound 112 as part of an audiovisual presentation, but other sound sources are also contemplated including doorbells, (human) speakers, audio speakers, computers, and vehicles. Illustrated media device 108 is a mobile phone, tablet, or other processing device, which may have access to a network access point 110 (shown here as a cell tower). Media device 108 sends and receives streaming data 114 potentially representing sound to enable a user to converse with (or otherwise interact with) a remote user, service, or computer application. Arrays of one or more microphones 118 and 120 may receive sound 112, which the devices 102, 104 may digitize, process, and play through earphone speakers 119, 121 in the ear canal. The wireless audio devices 102, 104 employ a low latency streaming link 116 to convey the digitized audio between them, enabling improved audio signals to be rendered by the speakers 119, 121.

Various suitable implementations exist for the low latency streaming link 116, such as a near field magnetic induction (NFMI) protocol, which can be implemented with a carrier frequency of about 10 MHz is used. NFMI enables dynamic exchange of data between audio devices 102, 104 at low power levels, even when on opposite sides of a human head. Streaming data 114 is more typically conveyed via Bluetooth or Bluetooth Low Energy (BLE) protocols.

For CROS and BiCROS operation, the audio devices detect, digitize, and apply monaural processing to the sound received at that ear. One or both of the audio devices convey the digitized sound as a cross-lateral signal to the other audio device via the dedicated point-to-point link 116. The receiving device(s) apply a binaural processing operation to combine the monaural signal with the cross-lateral signal before converting the combined signal to an in-ear audio signal for delivery to the user's ear. Audio data streaming entails rendering ("playing") the content represented by the data stream as it is being delivered. CROS and audio data streaming employ wireless network packets to carry the data payloads to the target device. Channel noise and interference may cause packet loss, so the various protocols may employ varying degrees of buffering and redundancy, subject to relatively strict limits on latency. For example, latencies in excess of 20 ms are noticeable to participants in a conversation and widely regarded as undesirable. To support CROS and BiCROS features, very low latencies (e.g., below 5 ms end-to-end) are required to avoid undesirable "echo" effects. In energy-limited applications such as hearing aids, the latency requirements must be met while the operation is subject to strict power consumption limits.

FIG. 2 is a block diagram of an illustrative wireless audio device 202 that supports the use of a low-latency wireless streaming protocol suitable for CROS/BiCROS operation or other audio communication protocols. The audio device may be a hearing aid or wearable device, though the principles disclosed here are applicable to any wireless network device. Device 202 includes a radio frequency (RF) module 204 (at times referred to as a radio module) coupled to an antenna 206 to send and receive wireless communications. The radio module 204 is coupled to a controller 208 that sets the operating parameters of the radio module 204 and employs it to transmit and receive wireless streaming communications. The controller 208 is preferably programmable, operating in accordance with firmware stored in a nonvolatile memory 210. A volatile system memory 212 may be employed for digital signal processing and buffering.

A signal detection unit 214 collects, filters, and digitizes signals from local input transducers 216 (such as a microphone array). The detection unit 214 further provides direct memory access (DMA) transfer of the digitized signal data into the system memory 212, with optional digital filtering and downsampling. Conversely, a signal rendering unit 218 employs DMA transfer of digital signal data from the system memory 212, with optional upsampling and digital filtering prior to digital-to-analog (D/A) conversion. The rendering unit 218 may amplify the analog signal(s) and provide them to local output transducers 220 (such as a speaker or piezoelectric transducer array).

Controller 208 extracts digital signal data from the wireless streaming packets received by radio module 204, optionally buffering the digital signal data in system memory 212. As signal data is acquired by the signal detection unit 214, the controller 208 may collect it and perform audio compression to form data payloads for the radio module to frame and send, e.g., as cross-lateral data via the point-to-point wireless link 116. The controller 208 may provide error correction code encoding to add controlled redundancy for protection against errors in transmitted data, and conversely may employ an error correction code decoder to detect bit errors in received data, correcting them if possible prior to performing decompression to convert the received audio data into a received audio stream. Latency and power consumption restrictions may limit audio compression and complexity.

The controller 208 or the signal rendering unit 218 combines the acquired digital signal data with the wirelessly received signal data, applying filtering and digital signal processing as desired to produce a digital output signal which may be directed to the local output transducers 220. Controller 208 may further include general purpose input/output (GPIO) pins to measure the states of control potentiometers 222 and switches 224, using those states to provide for manual or local control of on/off state, volume, filtering, and other rendering parameters. At least some contemplated embodiments of controller 208 include a RISC processor core, a digital signal processor core, special purpose or programmable hardware accelerators for filtering, array processing, and noise cancelation, as well as integrated support components for power management, interrupt control, clock generation, and standards-compliant serial and parallel wiring interfaces.

The software or firmware stored in memories 210, 212, may cause the processor core(s) of the controller 208 to implement a low-latency wireless streaming method using ADPCM compression with an enhanced performance as described further below. Alternatively the controller 208 may implement this method using application-specific integrated circuitry.

FIG. 3 illustrates a typical data flow in an illustrative audio communication system. Prior to transmission, digitized audio signal samples $a_k$ are compressed to reduce bandwidth requirements. An audio compressor 302 such as, e.g., an adaptive differential pulse code modulator (ADPCM) enables a stream of 24-bit audio signal samples $a_k$ to be well represented as a stream of, e.g., 5-bit quantized errors $q_k$ measured relative to the output of a recursive prediction filter. Some systems enable the degree of compression to be varied, producing, e.g., quantized error resolutions ranging from 5- to 16-bits.

As the compression process removes most of the signal redundancy, an error correction code (ECC) encoder 304 re-introduces a controlled amount of redundancy to enable error detection and correction (within limits). The added redundance may take the form of parity bits sufficient to enable correction of a single bit error in each data packet.

Box 306 represents a digital communications channel that includes a modulator to convert the ECC-encoded digital audio data $d_k$ into channel symbols, a transmitter to send the channel symbols across a wireless signaling medium, and a receiver-demodulator that receives potentially-corrupted channel symbols from the signaling medium and converts them to estimated digital audio data $\hat{d}_k$ that potentially includes bit errors. An ECC decoder 308 operates on the estimated digital audio data to detect one or more bit errors in each packet, correcting them when possible (e.g., when only a single error is present).

An audio decompressor 310 reverses the operation of compressor 302 to reconstruct a stream of digital audio samples $\hat{a}_k$ from the stream of audio error samples $\hat{q}_k$. A digital to analog converter 312 converts the stream of digital audio samples into an analog audio signal $a_t$, which a speaker or other audio transducer 314 converts into a sound signal $s_t$.

FIG. 4A is a schematic of an illustrative ADPCM compressor. A difference element 402 receives a predicted value from a prediction filter 422 and subtracts it from an audio sample $x_k$, producing a prediction error $e_k$. A scaling element 406 multiplies the prediction error by an inverted envelope estimate from inverter 408, obtaining a scaled error value that better fits the range of quantizer 410. Quantizer 410 derives a quantized error value $q_k$ from the scaled prediction error. The quantizer 410 may use nonlinear quantization (e.g., μ-law or A-law logarithmic encoding) enabling a relatively small number of bits to represent a large range while minimizing perceived quantization noise. The quantizer may be configurable, enabling the bit resolution of the quantized error values $q_k$ to be varied from, say, 5 to 16 bits.

Elements 412-422 mimic the operation of the receiving device so as to enable the receiving device to reconstruct the audio sample stream $x_k$ from the quantized error values $q_k$. A dequantizer 412 converts the quantized error value $q_k$ into a reconstructed version of the scaled error value. A multiplier 414 multiplies this scaled error value by the envelope estimate $v_{k-1}$ to obtain a reconstructed error value $\hat{e}_k$. An envelope estimator 418 operates on the sequence of reconstructed error values $\hat{e}_k$ to provide the envelope estimate $v_k$ to a delay element 416, which makes the preceding estimate $v_{k-1}$ available to the multiplicative inverter 408 and multiplier 414. A summation element 420 adds the reconstructed error values $\hat{e}_k$ to the predicted value to obtain the reconstructed audio sample stream $\hat{x}_k$. The prediction filter 422 operates on the reconstructed audio sample stream $\hat{x}_k$ to obtain the next audio sample prediction which is used by difference element 402.

FIG. 4B is a schematic showing how elements 412-422 may be configured to implement an ADPCM decompressor in the receiving device.

The audio compressor and decompressor make the best use of the available bit resolution for the quantization error $q_k$ when the envelope estimators 418 provide an accurate scale factor for matching the range of the prediction error $e_k$ to that of the quantizer 410. For faithful reconstruction of the audio sample stream, the envelope estimate on the receiver side must converge with that on the transmit side, even in the presence of data transmission errors. Estimators 418 use lossy integration with a damping factor 13 chosen to provide the desired tradeoff between robustness and performance. Fidelity of the reconstructed audio sample stream quickly degrades when scaled prediction errors exceed the range of the quantizer, which can occur when the envelope estimate is overly damped.

FIG. 5 shows an illustrative envelope estimator. An amplifier 502 applies a static gain g to the reconstructed error values $\hat{e}_k$. A squaring element 504 squares the amplified error value for comparison with a squared version of the previous envelope estimate $v_{k-1}$ from squaring element 506. Comparator 508 asserts a selection signal when the (squared) envelope estimate is less than the (squared) amplified error value, indicating that the error envelope is increasing. Conversely, the selection signal is de-asserted when the envelope estimate is decreasing. Based on the selection signal, a multiplexer 510 selects between an attack parameter $\lambda_A$ and a release parameter $\lambda_R$. The attack and release parameter values are selected empirically to follow the variance of prediction error as closely as possible for various audio conditions.

In the integration operation, the selected parameter sets the weighting between the previous envelope value and the new error contribution. A difference element 512 subtracts the selected parameter value from one to obtain the weight for the previous envelope value. A multiplier 514 multiplies the damped (squared) previous envelope value with the calculated weight, while another multiplier 516 multiplies the (squared) amplified error value by the selected parameter value. An adder 520 combines the weighted values to obtain the new squared envelope estimate. A square root element 522 takes the square root to provide the new envelope estimate. A limiter 524 may be used to ensure the envelope estimate $v_k$ does not exceed a maximum value or fall below a minimum value.

A delay element 526 latches the envelope estimate $v_k$ to make a previous envelope estimate $v_{k-1}$ available for use. A power element 518 calculates the damped squared previous envelope value $v_{k-1}^{2\beta}$, where β is the damping factor chosen to provide robustness against transmission errors. The damping factor β is in the range between one and zero. Setting β equal to one would provide no protection against transmission errors. As β decreases toward zero, the rate of recovery from transmission errors increases at the expense of reduced audio quality.

The envelope estimator of FIG. 5 has an adaptation process that is essentially independent of the envelope estimate value. As a consequence, the envelope estimate can be slow to respond to sudden increases when the envelope estimate is relatively small, adversely impacting the audio fidelity. Enhanced performance can be achieved by making the gain g a function of the envelope estimate.

FIG. 6 is a schematic of a second illustrative envelope estimator using a dynamic gain to enable an enhanced response. An attenuator 628 scales the envelope estimate by an attenuation factor α. A difference element 630 subtracts the attenuated envelope value from a maximum gain factor $g_{max}$. A limiter 632 keeps the dynamic gain between predetermined maximum and minimum gain values when supplying it to amplifier 602. Amplifier 602 applies the dynamic gain to the reconstructed error values $\hat{e}_k$. The difference element 630 ensures the dynamic gain is near its maximum when the envelope estimate is small, reducing the gain value for larger values of the envelope estimate. This configuration increases responsiveness of the envelope estimate when the error envelope is small, avoiding any loss of audio fidelity.

The inventor has observed that the use of a dynamic gain drastically accelerates the recovery from transmission errors, as any resulting mismatch in the encoder's and decoder's envelope detector values is corrected on the decoder side by the combined effects of the damping factor and the mismatch in the dynamic gain. This accelerated correction obviates any incentive for communicating the transmitter's dynamic gain and envelope values via a side channel or other means.

Figure 7:
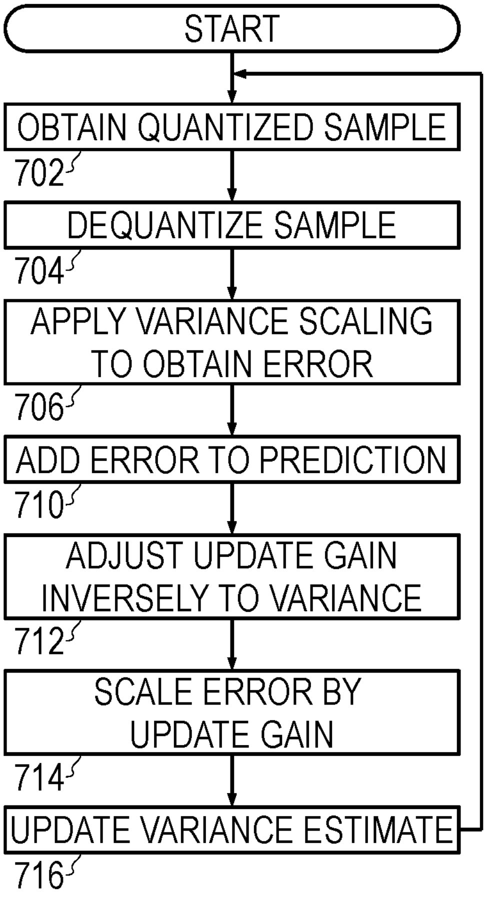
FIG. 7 is a flow diagram for an illustrative audio communication method.

FIG. 7 is a flow diagram for an illustrative audio communication method that may be implemented by the receiving device (and mimicked by the transmitting device). The device obtains a quantized error sample $q_k$ in block 702, and dequantizes it in block 704 to obtain a reconstructed scaled error value. In block 706, the scaled error value is multiplied by an envelope estimate $v_{k-1}$ to produce a reconstructed error value $\hat{e}_k$. This value is combined with a predicted value in block 710 to yield a reconstructed audio sample $\hat{x}_k$. In block 712, the device uses the envelope estimate $v_{k-1}$ to adjust the dynamic gain, subtracting an attenuated estimate value from a maximum gain $g_{max}$. In block 714, the device multiplies the reconstructed error value $\hat{e}_k$ with the dynamic gain, then uses the product in block 716 to update the envelope estimate $v_k$.

While the foregoing discussion has focused on audio streaming in the context of hearing aids, the foregoing principles are expected to be useful for many applications, particularly those involving audio streaming to or from smart phones or other devices low latency wireless audio streaming. Any of the controllers described herein, or portions thereof, may be formed as a semiconductor device using one or more semiconductor dice. Though the operations shown and described in FIG. 7 are treated as being sequential for explanatory purposes, in practice the method may be carried out by multiple integrated circuit components operating concurrently and perhaps even with speculative completion. The sequential discussion is not meant to be limiting. These and numerous other modifications, equivalents, and alternatives, will become apparent to those skilled in the art once the above disclosure is fully appreciated.

It will be appreciated by those skilled in the art that the words during, while, and when as used herein relating to circuit operation are not exact terms that mean an action takes place instantly upon an initiating action but that there may be some small but reasonable delay(s), such as various propagation delays, between the reaction that is initiated by the initial action. Additionally, the term while means that a certain action occurs at least within some portion of a duration of the initiating action. The use of the word approximately or substantially means that a value of an element has a parameter that is expected to be close to a stated value or position. The terms first, second, third and the like in the claims or/and in the Detailed Description or the Drawings, as used in a portion of a name of an element are used for distinguishing between similar elements and not for describing a sequence, either temporally, spatially, in ranking or in any other manner. It is to be understood that the terms so used are interchangeable under appropriate circumstances and that the embodiments described herein are capable of operation in other sequences than described or illustrated herein. Inventive aspects may lie in less than all features of any one given implementation example. Furthermore, while some implementations described herein include some but not other features included in other implementations, combinations of features of different implementations are meant to be within the scope of the invention, and form different embodiments as would be understood by those skilled in the art.

What is claimed is:

1. An audio communication device that comprises:

a difference element configured to produce a sequence of prediction error values by subtracting a sequence of predicted audio sample values from a sequence of audio samples;

a scaling element configured to produce a sequence of scaled error values by dividing each prediction error value by a corresponding envelope estimate;

a quantizer configured to operate on the sequence of scaled error values to produce a sequence of quantized error values;

a multiplier configured to use the corresponding envelope estimates to produce a sequence of reconstructed error values;

a predictor configured to produce the sequence of predicted audio sample values based on reconstructed audio samples derived from the sequence of reconstructed error values; and an envelope estimator including:

an updater configured to apply a dynamic gain to the reconstructed error values to produce a sequence of update values; and an integrator configured to combine each of the update values with the corresponding envelope estimate to produce a subsequent envelope estimate, wherein the dynamic gain decreases from a maximum gain value to a minimum gain value as the corresponding envelope estimate increases.

2. The audio communication device of claim 1, further comprising an encoder configured to convert the sequence of quantized error values into an audio data stream for storage or transmission.

3. The audio communication device of claim 1, wherein the envelope estimator further includes:

a second difference element that determines a difference between the maximum gain value and a scaled version of the corresponding envelope estimate; and a range limiter that produces the dynamic gain by limiting the difference to a range between the minimum and maximum gain values.

4. The audio communication device of claim 3, wherein the envelope estimator further includes a comparator to select a larger attack parameter weighting for the update values having a larger magnitude than the corresponding envelope estimate and a smaller release parameter weighting for the update values having a smaller magnitude than the corresponding envelope estimate.

5. The audio communication device of claim 1, wherein the quantizer is nonlinear, and the device further comprises a dequantizer configured to operate on the sequence of quantized error values to provide the multiplier with reconstructed scaled error values.

6. The audio communication device of claim 1, wherein between the maximum gain and minimum gain value the dynamic gain varies linearly with the corresponding envelope estimate.

7. An audio communication receiver configured to receive an audio data stream conveying a sequence of quantized error values, the receiver comprising:

a multiplier configured to use corresponding envelope estimates to produce a sequence of reconstructed error values based on the sequence of quantized error values;

a summation element configured to combine the sequence of reconstructed error values with a sequence of predicted audio sample values to produce a sequence of reconstructed audio samples;

a predictor configured to produce the sequence of predicted audio sample values based on the sequence of reconstructed audio samples; and an envelope estimator including:

an updater configured to apply a dynamic gain to the reconstructed error values to produce a sequence of update values; and an integrator configured to combine each of the update values with the corresponding envelope estimate to produce a subsequent envelope estimate, wherein the dynamic gain decreases from a maximum gain value to a minimum gain value as the corresponding envelope estimate increases.

8. The audio communication receiver of claim 7, further comprising a dequantizer configured to operate on the sequence of quantized error values to provide the multiplier with reconstructed scaled error values.

9. The audio communication receiver of claim 8, further comprising a decoder configured to convert the audio data stream into the sequence of quantized error values for the dequantizer.

10. The audio communication receiver of claim 7, wherein the envelope estimator further includes:

a second difference element that determines a difference between the maximum gain value and a scaled version of the corresponding envelope estimate; and a range limiter that produces the dynamic gain by limiting the difference to a range between the minimum and maximum gain values.

11. The audio communication receiver of claim 10, wherein the envelope estimator further includes a comparator to select a larger attack parameter weighting for the update values having a larger magnitude than the corresponding envelope estimate and a smaller release parameter weighting for the update values having a smaller magnitude than the corresponding envelope estimate.

12. An audio communication method that comprises:

obtaining a sequence of quantized error values from an audio data stream;

using corresponding envelope estimates to produce a sequence of reconstructed error values based on the sequence of quantized error values;

combining the sequence of reconstructed error values with a sequence of predicted audio sample values to produce a sequence of reconstructed audio samples;

producing the sequence of predicted audio sample values based on the sequence of reconstructed audio samples; and deriving the corresponding envelope estimates by:

applying a dynamic gain to the reconstructed error values to produce a sequence of update values; and combining each of the update values with the corresponding envelope estimate to produce a subsequent envelope estimate, wherein the dynamic gain decreases from a maximum gain value to a minimum gain value as the corresponding envelope estimate increases.

13. The audio communication method of claim 12, further comprising a dequantizing the sequence of quantized error values to provide reconstructed scaled error values for multiplication with the corresponding envelope estimates.

14. The audio communication method of claim 13, further comprising employing an error correction code decoder as part of said obtaining the sequence of quantized error values from the audio data stream.

15. The audio communication method of claim 12, wherein as part of said deriving, the method further includes:

determining a difference between the maximum gain value and a scaled version of the corresponding envelope estimate; and producing the dynamic gain by limiting the difference to a range between the minimum and maximum gain values.

* * * * *